US005574519A

United States Patent [19]
Manico et al.

[11] Patent Number: 5,574,519
[45] Date of Patent: Nov. 12, 1996

[54] TALKING PHOTOALBUM

[75] Inventors: Joseph A. Manico, Rochester; Cynthia S. Bell, Webster, both of N.Y.

[73] Assignee: Eastman Kodak Company, Rochester, N.Y.

[21] Appl. No.: 237,077

[22] Filed: May 3, 1994

[51] Int. Cl.$^6$ .............. G03B 29/00; G09F 11/30
[52] U.S. Cl. .................. 396/429; 360/1; 40/455; 40/508; 40/513; 434/308
[58] Field of Search ............... 354/76, 75, 105, 354/106, 288; 353/15; 360/1, 2, 3; 40/455, 457, 463, 489, 490, 491, 508, 513, 159, 906; 434/308, 309, 311, 317

[56] References Cited

U.S. PATENT DOCUMENTS

| | | | |
|---|---|---|---|
| 3,691,312 | 9/1972 | Petersen | 179/100.2 Z |
| 3,884,565 | 5/1975 | Tanno | 434/308 |
| 3,928,928 | 12/1975 | Kalust | 40/28.1 |
| 4,434,567 | 3/1984 | LeVeau | 40/157 |
| 4,636,881 | 1/1987 | Brefka et al. | 360/74.1 |
| 4,681,548 | 7/1987 | Lemelson | 434/308 |
| 4,703,573 | 11/1987 | Montgomery et al. | 40/455 |
| 4,728,978 | 3/1988 | Inoue et al. | 354/106 |
| 4,809,246 | 2/1989 | Jeng | 434/317 |
| 4,884,974 | 12/1989 | DeSmet | 434/317 |
| 4,939,860 | 7/1990 | Ackeret | 40/513 |
| 4,990,092 | 2/1991 | Cummings | 434/317 |
| 5,036,344 | 7/1991 | Inoue et al. | 354/106 |
| 5,128,700 | 7/1992 | Inoue et al. | 354/76 |
| 5,263,865 | 11/1993 | Zipf | 434/309 |
| 5,276,472 | 1/1994 | Bell et al. | 354/76 |
| 5,313,235 | 5/1994 | Inoue | 354/76 |
| 5,359,374 | 10/1994 | Schwartz | 354/76 |
| 5,387,955 | 2/1995 | Cocca | 354/76 |
| 5,437,552 | 8/1995 | Baer et al. | 434/319 |

FOREIGN PATENT DOCUMENTS

| | | | |
|---|---|---|---|
| 0139778 | 5/1985 | European Pat. Off. | G09B 5/06 |
| 0609048 | 8/1994 | European Pat. Off. | G09B 5/06 |
| WO95/05650 | 8/1994 | WIPO | G09B 5/00 |

*Primary Examiner*—A. A. Mathews
*Attorney, Agent, or Firm*—Peter J. Bilinski

[57] ABSTRACT

A display apparatus capable of displaying a plurality of still images having an audio subsystem for selectively storing and playing back audio information corresponding to at least one displayed still image. According to the invention, the audio subsystem can alternatively be releasably attached, such as to a camera to selectively store audio information, or to an album displaying the images.

22 Claims, 16 Drawing Sheets

| NUMBER OF PRINT | 39 |
|---|---|
| TOP PRINT | 11 |
| PRINT INDEX # | AUDIO SEGMENT # |
| 1 | 1 |
| 2 | 2 |
| 3 | - |
| 4 | - |
| 5 | 3 |
| 6 | 4 |
| 7 | 5 |
| 8 | - |
| 9 | 6 |
| 10 | - |
| 11 | 7 |
| 34 | 15 |
| 35 | - |
| 36 | - |
| 37 | - |
| 38 | 16 |
| 39 | 17 |

5,574,519

TALKING PHOTOALBUM

FIELD OF THE INVENTION

This invention pertains to the field of photography, and in particular to apparatus for combining still image media with audio segments.

BACKGROUND OF THE INVENTION

In the field of photography it is desirable to supply data related to photographic prints so as to identify the subject or event, to provide date and time information, or for a variety of other purposes. This data is useful to individuals who are viewing the prints when they are displayed at a future time.

It is known that audio information can be supplied when a subject or event is being video recorded, but this procedure is not conducive to still photographic prints. Digital or magnetic data can be added to still photographs, but the data which is added is usually relatively brief and amounts to no more than the date and time, rather than dealing with the specifics of an event or other information.

There is a need, as is apparent from the above discussion, to be able to supply audio information corresponding to a collection of photographic prints or other still image media in which the information can be separately and selectively provided to correspond to one or some of the prints and in which the audio information can be conveniently played back when the prints are being displayed.

SUMMARY OF THE INVENTION

The present invention is directed to overcoming one or more of the problems described above. Briefly summarized, according to one aspect of the present invention, there is provided a display apparatus comprising display means for displaying a plurality of still images, characterized by:

means attached to the display means for storing audio information corresponding to at least one still image to be displayed; and means attached to the display means for playing back audio information stored by the storage means when at least one still image is displayed.

According to another aspect of the present invention, there is provided a display apparatus comprising display means for holding a plurality of still images and for displaying the images in a viewing aperture, and advance means for sequentially advancing the images to the viewing aperture, characterized by:

storage means for storing audio information corresponding to at least one of a plurality of still images to be displayed in the viewing aperture; and playback means for playing back audio information stored by the storage means when at least one still image is advanced to the viewing aperture for display.

According to another aspect of the invention there is provided a system for combining audio information with still image media comprising a camera for the taking of exposures and a display apparatus having means for displaying at least one photographic print of an exposure taken by said camera, characterized by:

a movable device having attachment means for attaching to said camera and/or said display apparatus, and means for selectively recording and playing back audio information corresponding to an exposure taken by said camera and/or a photographic print displayed by the display apparatus.

According to yet another aspect of the invention there is provided a camera having means for the taking of photographs, characterized by:

a releasably removable device having means for selectively recording and playing back audio information corresponding to at least one photograph taken by said camera; and means for detaching said device from the camera.

An advantageous feature realized by the present invention is that audio data can be provided to any number of displayed photographic prints or other still image media to be retrieved for playback at a later convenient time when the print is later being viewed.

An additional advantageous aspect of the current invention is that the actual voices of the participants of the event being photographed can be added to describe or relate the event.

Still another advantageous aspect of the present invention is that photographic prints or other still image media, such as slide mounts, and corresponding audio data can be retained together, such as to provide a talking photoalbum.

These and other features and advantages of the present invention will be more clearly understood and appreciated from a review of the following Detailed Description of the Preferred Embodiments and appended claims, and by reference to the accompanying drawings.

DESCRIPTION OF THE PREFERRED EMBODIMENTS

The following embodiments refer to various conventions such as "top", "bottom", "side", "upper", "lower", "above", "under", etc. These descriptors are made only to provide a frame of reference and should not limit the description provided herein.

Figure 1:
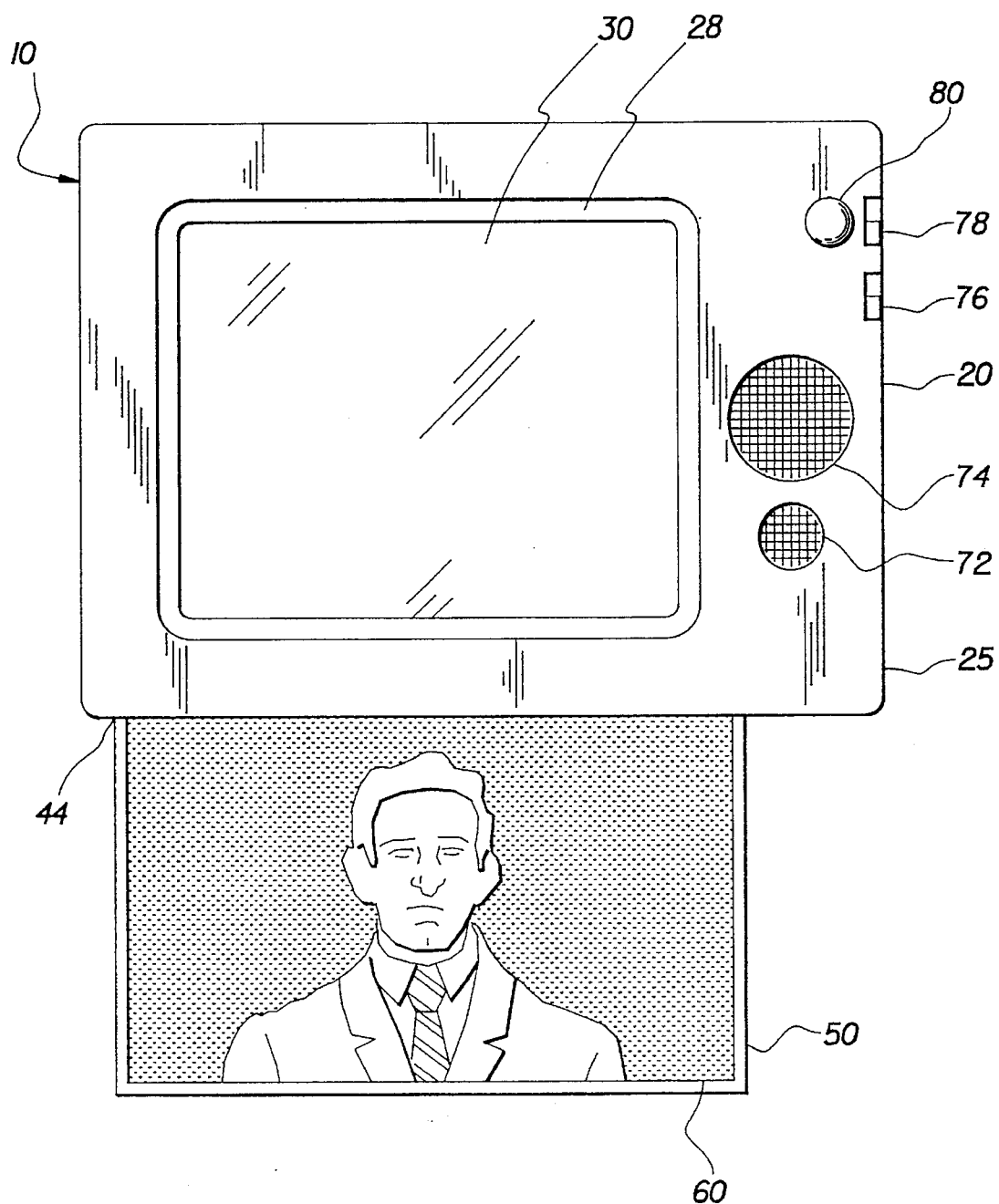
FIG. 1 depicts a top perspective view of a device defining a first embodiment according to the present invention.
Figure 2:
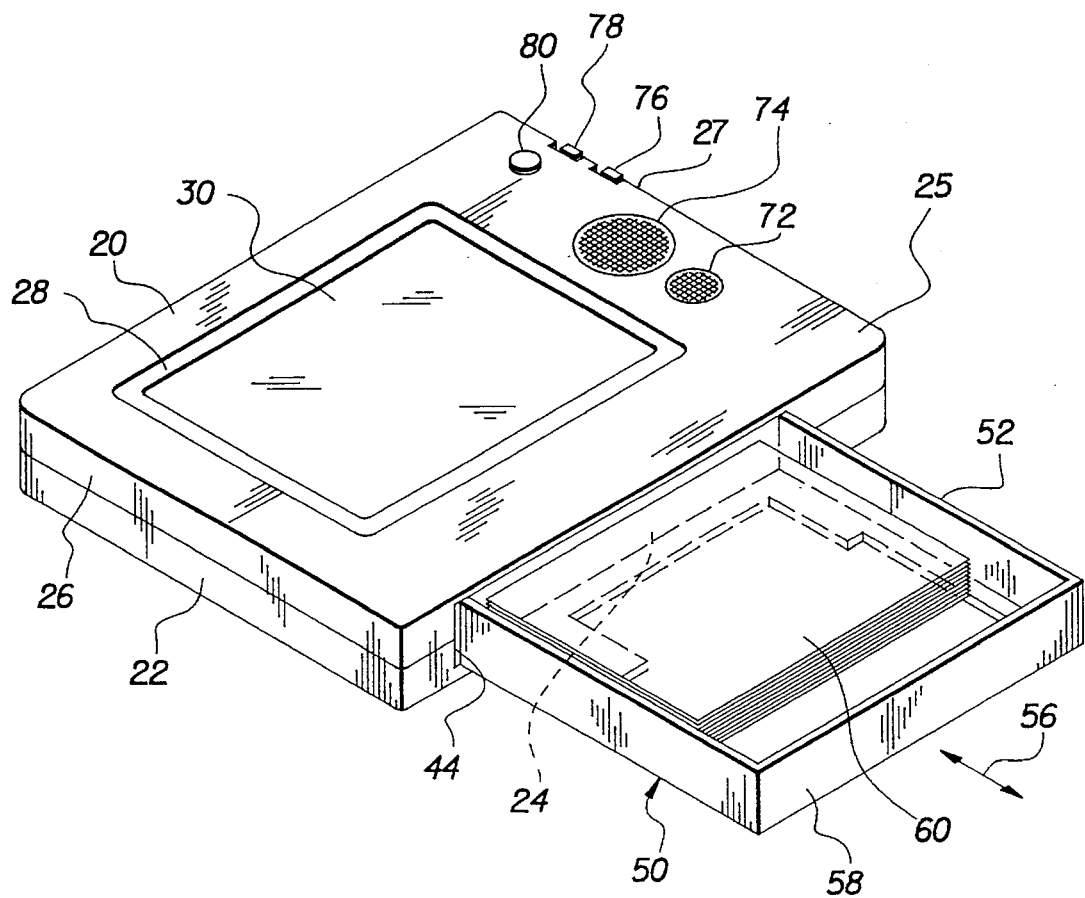
FIG. 2 is an isometric view of the device illustrated in FIG. 1.

Referring to FIGS. 1 through 5, a first embodiment of the present invention is described. Referring to FIGS. 1 and 2, there is provided a photographic print holder 10, comprising a housing 20 and an engageable cartridge 50. The cartridge 50 is sized for receiving and supporting a plurality of photographic prints which can be preferably arranged therein for display and is engageable with the housing 20, as described in greater detail below.

The housing 20 according to this embodiment is made up of a bottom shell section 22 having a floor 24, a top shell section 26 having a viewing aperture 28, and a clear or transparent plastic window 30 which is sized to fit within the viewing aperture.

Cartridge 50, is preferably a one-piece element having a pair of side pieces 52, a separator bar 54, and a front wall 58 joining the side pieces 52, which are of an L-shaped cross section to form a frame-like structure. Both the housing 20 and the cartridge 50 are preferably injection-molded plastic parts.

The cartridge 50 is made to be slideably engageable within a defined slot 44 of the housing 20. A set of stop members (not shown) can be provided on the separator bar 54 to engage with corresponding stop members (not shown) located on the edges of the slot 44, in order to retain the cartridge 50 integrally with the housing 20, but allowing the cartridge 50 to be slideably movable therein.

Figures 3, 6:
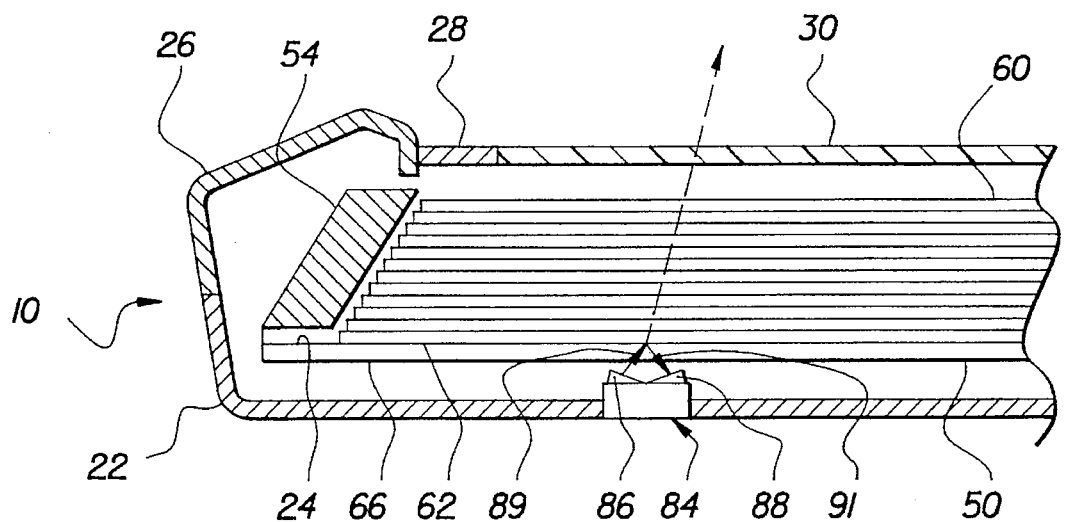
FIG. 3 is a partial side elevational view, partially in section, of the device shown in FIGS. 1 and 2.
FIG. 6 is a tabular listing of entries made to the nonvolatile memory storage area of a controller determinative of the relative locations of photographic prints used in the device shown in FIGS. 1–5.

In operation, and referring now to FIGS. 1–3, a vertically arranged stack 60 of photographic prints are loaded into the body of the cartridge 50 and are supported therein by the side pieces 52. As the cartridge 50 is pushed into the housing 20 through slot 44, per arrow 56, the bottommost photograph 62, of the stack 60 is separated by means (not shown) from the remainder of the stack. When the cartridge 50 is subsequently removed from the housing 20, the separated photograph 62 is retained within the housing 20 and guided towards the viewing aperture 28 where it is centered for display in the window 30. The remainder of the stack 60 remains intact within the cartridge 50 against the separator bar 54.

Reengagement of the cartridge 50 with the housing 20, as per arrow 56, causes the displayed print 62 to be repositioned to the top of the stack 60, while it is still centered against the window 30. The succeeding bottom print 64, is then separated from the remainder of the stack 60 and subsequently displayed in window 30 when the cartridge 50 is removed from the housing 20. Additional details relating to the structure of the described device and particularly the print advancement features including the separating and retaining means, are described in greater detail in U.S. Pat. No. 4,939,860, issued to P. Ackeret and assigned to Licinvist, AG. This patent is hereby incorporated by reference.

The photographic print holder 10 described above and in greater detail in the cross referenced patent provides a convenient means for retaining a stack of photographic prints and for sequentially advancing each print in the stack for viewing. It will be appreciated from the discussion that follows, however, that other devices capable of retaining and advancing prints are also useful for the invention herein described and can be substituted in lieu of the particularly described structure. For example, an aggregation of prints, vertically stacked or otherwise configured, can be supported and advanced by a set of reciprocating forks (not shown) extending from the framed surface (not shown) of a holder in which a displayed photographic print can be either manually or mechanically lifted from an arrangement of prints and relocated to increment the arranged prints for display.

Having described the structural features of the particular apparatus as to the loading and advancement of displayed photographic prints, the audio storage and playback features of the present device according to this embodiment will now be described.

Figure 4:
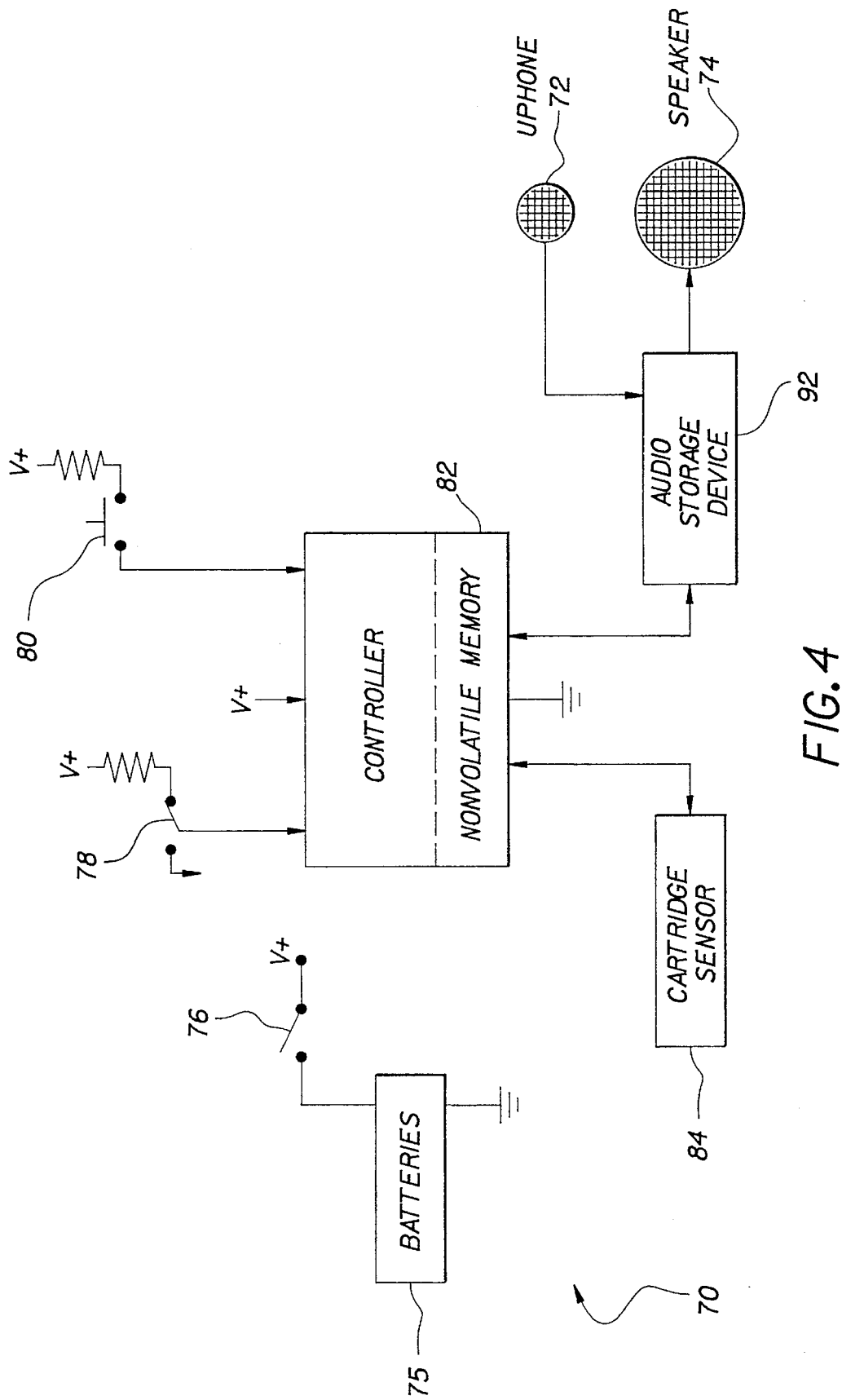
FIG. 4 is a schematic diagram of the electrical subsystem of the device shown in FIGS. 1 and 2.

Referring to FIGS. 1, 2 and 4, the print holder 10 is provided with an audio subsystem 70 having a microphone 72 and an audio loudspeaker 74, as are conventionally known, which are attached to a exterior supporting surface 25 of the housing 20. A controller 82 is positioned within the body of the housing 20 for coordinating the capture and playback of audio information. Preferably, the controller 82 is a microprocessor, such as a Motorola M68HC805B6, having a nonvolatile memory storage area. The controller 82 is electrically interconnected to the remainder of the apparatus according to the schematic of FIG. 4. A power supply 75, in the form of batteries, is also provided within the housing portion 20. Switches 76, 78 arranged along an exterior edge 27 of the supporting surface 25 are interconnected to the controller 82 and the power supply 75 for supplying power to the audio subsystem 70 and for enabling the device to be placed in either an audio RECORD mode or an audio PLAYBACK mode, respectively. A START button 80 is also provided adjacently positioned along the supporting surface 25 and is interconnected to the controller 82 according to the schematic in FIG. 4. The operation of each of the above components is described in greater detail below.

An audio storage device 92, FIG. 4, is disposed either within or attachable to the housing 20. According to this embodiment, the audio storage device 92 is a single audio integrated circuit (IC) memory chip, preferably one of the ISD 2500 family, manufactured by Information Storage Systems, Inc. having integral audio pre and post-postprocessing capability, as well as analog audio storage and drivers for the microphone 72 and the loudspeaker 74. The audio storage device 92 is interconnected to the previously described components according to the schematic of FIG. 4. It should be apparent, however, that other devices capable of recording and playback of audio messages can also be used; for example, other integrated circuit (IC) chips such as the model OKI M9M6378 manufactured by Oki Semiconductors, Inc. are also considered useful in addition to other numerous multi-IC component design alternatives, which are conventionally known, though these devices may be less convenient in size than those described above.

In addition, a cartridge sensor 84, FIGS. 3 and 4, comprising an LED 86 or other optical beam emitter and an adjacent detector, such as photosensor 88, is attached to the floor 24 of the housing 20. In this particular embodiment, a Spectronix SPX- 1160-3 is considered ideal as a sensor 84. The cartridge sensor 84 is configured so that the beam 89 emitted by the LED 86 is reflected back as beam 91 to the adjacent photosensor 88 if the emitted beam contacts the back surface 66 of a print of a stack 60. Otherwise, the emitted beam 89 continues uninterrupted through the window 30 (as shown in phantom according to FIG. 2) and is not reflected back sufficiently to be sensed by the photosensor 88.

Figure 5:
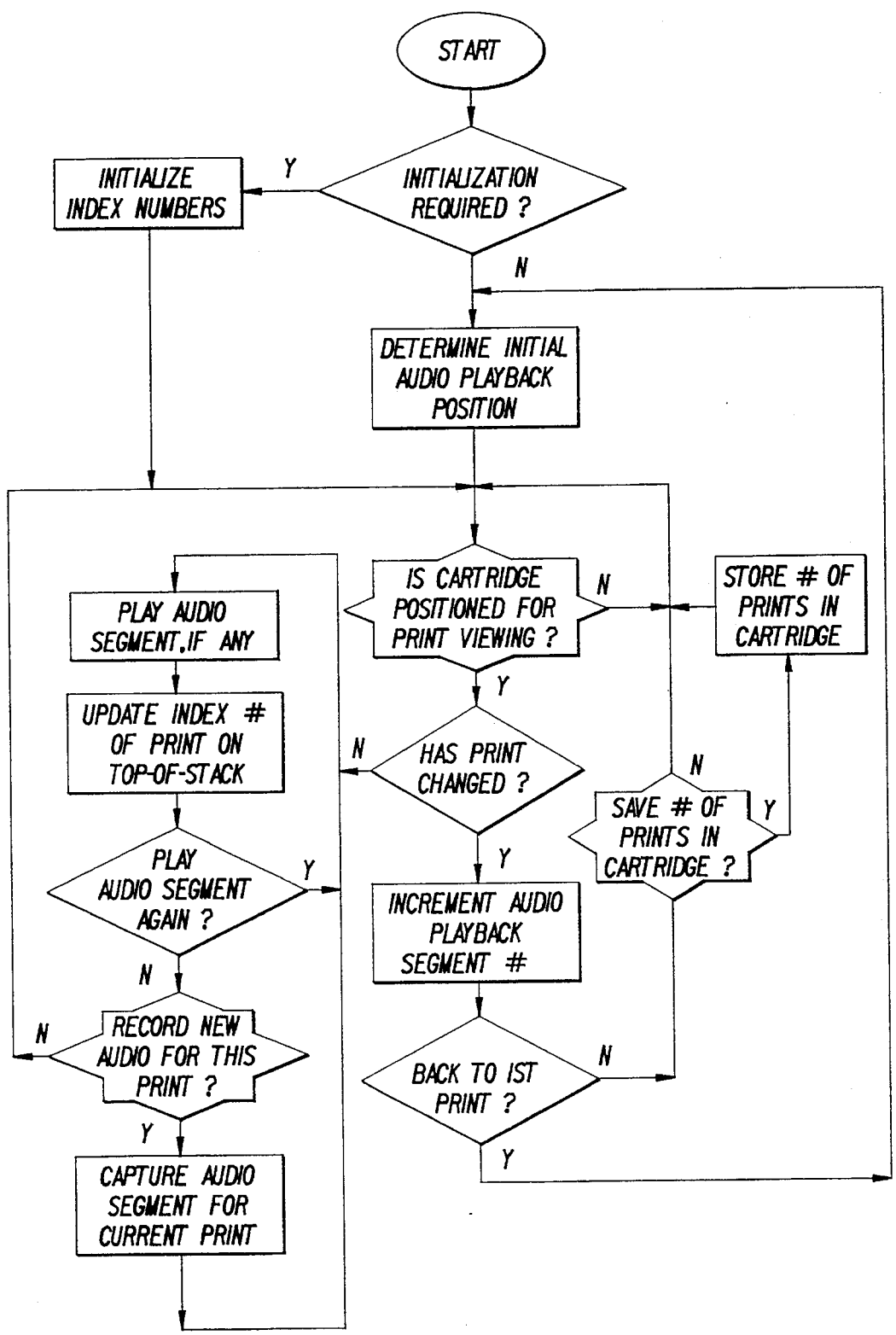
FIG. 5 is a logic diagram showing operative modes of the device shown in FIGS. 1–4.

The operation of the print holder 10 in its totality can now be described by referring to FIGS. 1–5, and in particular the logic diagram of FIG. 5.

Upon setting the POWER switch 76 to the ON position, the controller 82 determines an audio playback position within its nonvolatile memory storage area by reading a print index number from an index register. The print index number identifies the number of the photographic print that is to be positioned at the top of the stack 60 and displayed in the holder 10.

When power is provided initially to the audio subsystem 70, however, there are no print index numbers in the index register. An initialization sequence, therefore, is required in order to derive print index numbers to create a correspondence between a stack 60 of photographic prints and any audio segments which are to be recorded and stored for subsequent playback.

As a first step in this initialization sequence, the controller 82 accesses the cartridge sensor 84 to determine whether a cartridge 50 containing a set of photographic prints is present within the housing 20.

If the optical beam 89 emitted by LED 86 is reflected off of the back surface 66 of the bottommost print 62, a signal from the photosensor 88 is communicated to the controller 82.

The receipt of a signal by the photosensor 88 indicates a picture is present in the window 30. Since no audio data is initially stored, the controller 82 proceeds to capture audio for the picture. First, the controller 82 assigns a print index number by incrementing the index register. Initially, the register is incremented from "0" to "1".

As described previously, the bottommost print 62 is separated from the remainder of the stack 60 and is retained within the housing 20 for display in window 30 after the cartridge 50 has been disengaged from the housing 20. During that time of disengagement, the signal from the photosensor 88 is not interrupted; that is, the emitted beam 89 is still being reflected off the back surface 66 to the photosensor.

After incrementing the index register, the controller 82 accesses the audio storage device 92 for audio recording and playback. To begin recording an audio message, the user sets the RECORD/PLAYBACK switch 78 to the RECORD position and depresses the START button 80 which causes the controller 82 to enable the microphone 72 and the audio storage device 92 for recording of sound information. An audio message is then recorded by the microphone 72 beginning at a discrete audio address within the audio storage device 92, as described in greater detail below. In this embodiment, the user is allowed a pre-set time limit eg; 15–20 seconds, to record an audio message.

Alternatively, a variety of audio programming modes can be utilized, depending on the memory capability and the sophistication of the audio storage device 92 and the controller 82. For example, the user could manually stop audio recording by depressing the START button 80 a second time after recording. Using this technique a longer message can be recorded; for example, an entire song could be recorded. Another recording technique could include the use of a VOX mode, similar to those found in conventional telephone answering machines, in which recording would cease automatically when no additional sound is detected by the microphone 72 in a given time period, eg., a 3 second duration.

The controller 82 stores the location of the audio address and the corresponding print index number in its nonvolatile memory storage area. A table is derived, such as illustrated in FIG. 6.

In a preferred arrangement, and following the recording of an audio message, the controller 82 replays the stored message automatically through the speaker 74 for verification. If, after the audio replay, the user is dissatisfied, an election can be made to modify or erase the message as herein described. While leaving switch 78 in the RECORD mode, depressing the START button 80 commands the controller 82 to reaccess the current audio address and to reenable the microphone 72 and audio storage device 92 to allow the user to record over the previously recorded audio segment.

Similarly, a user can elect to re-play the recorded audio message by setting switch 78 to the PLAY mode and then depressing the START button 80. This combination also causes the controller 82 to reaccess the present audio address in the audio storage device 92 and enables the speaker 74 and audio storage device for playback of the previously recorded audio segment.

Succeeding prints in the stack 60 are advanced for display in window 30 by disengaging and reengaging the cartridge 50 from and to the housing 20. This is done as described above by first pulling the cartridge 50 out of the housing 20 through slot 44 and then reengaging the cartridge 50 back into the housing 20. As each print is advanced, the index register established in the nonvolatile memory portion of the controller 82 is advanced by one position, via the interruption and subsequent reengagement of a signal from the cartridge sensor 84 to the controller 82. This advancement occurs independently of whether an audio message was recorded. Therefore, a print index number is assigned to each of the stacked photographic prints corresponding to the position of the print in the stack 60.

To record audio information corresponding to any subsequently displayed print, the previous sequence is repeated. That is, the START button 80 is depressed and a new audio address corresponding to the present index register location is accessed in the audio storage device 92, while the switch 78 is set to the RECORD mode. The user can then record or modify information pertaining to each succeeding print as previously described. In addition, the user may also elect not to record audio information pertaining to any or all of the prints. The controller 82 stores the position (index numbers) of the photographs as well as the corresponding audio addresses in which the information is stored in its nonvolatile memory storage area so as to form a playback list. See FIG. 6 which shows a particular list corresponding to a stack of 39 photographic prints. As is apparent from the illustrated list, an index number corresponding to the position of the print in the stack 60 is provided for each advanced print 1–39. Audio information, however, was not recorded for index numbers 3, 4, 8, 10, . . . , 35, 36, 37. Note: for the sake of brevity, a portion of the playback list corresponding to index numbers 12–33 is not shown.

After each of the prints have been advanced a first time for display in the window 30 and index numbers and corresponding audio addresses have been established into a playback list, the controller 82 can be instructed to return to the top of the playback list (ie: to revert to index number "1" corresponding to the print 62 of the stack 60). This can be done by turning off power to the device by appropriately setting the switch 76. Alternatively, mechanical or other known means can be used to sense whether the stack has been sequenced through to the end of the stack. For example, a transparent print may be added to the end of the stack.

In normal use, after audio information has been stored for a particular stack 60 of prints, switch 78 should be set to PLAYBACK mode, and the stored audio information is played back through speaker 74 automatically as each print in the stack 60 is advanced for display in window 30. That is, the controller 82 accesses the appropriate audio address for each print number as the index register is incremented according to the stored playback list.

If audio playback is not desired, then the power enable switch 76 can be set to the OFF position. The mechanical advancement of prints in window 30 of the photographic print holder 10 operates independently of the audio subsystem 70.

Alternately, the audio operation of the device can also be inhibited if the cartridge 50 is quickly engaged with the structural portion 20 while the POWER switch 76 is left ON. This allows a user to rapidly increment through a set of prints in a cartridge 50 until a print(s) of interest has been located. At any time during use, if the user is dissatisfied with an audio segment or wishes to add information to a print which may or may not have information stored, then switch 78 may be reset to RECORD mode and an audio message may be added as previously described.

A second embodiment of the present invention is now described with reference to FIGS. 7–10. The same reference numerals are used when referring to parts previously used in the first embodiment as described above.

Figure 7:
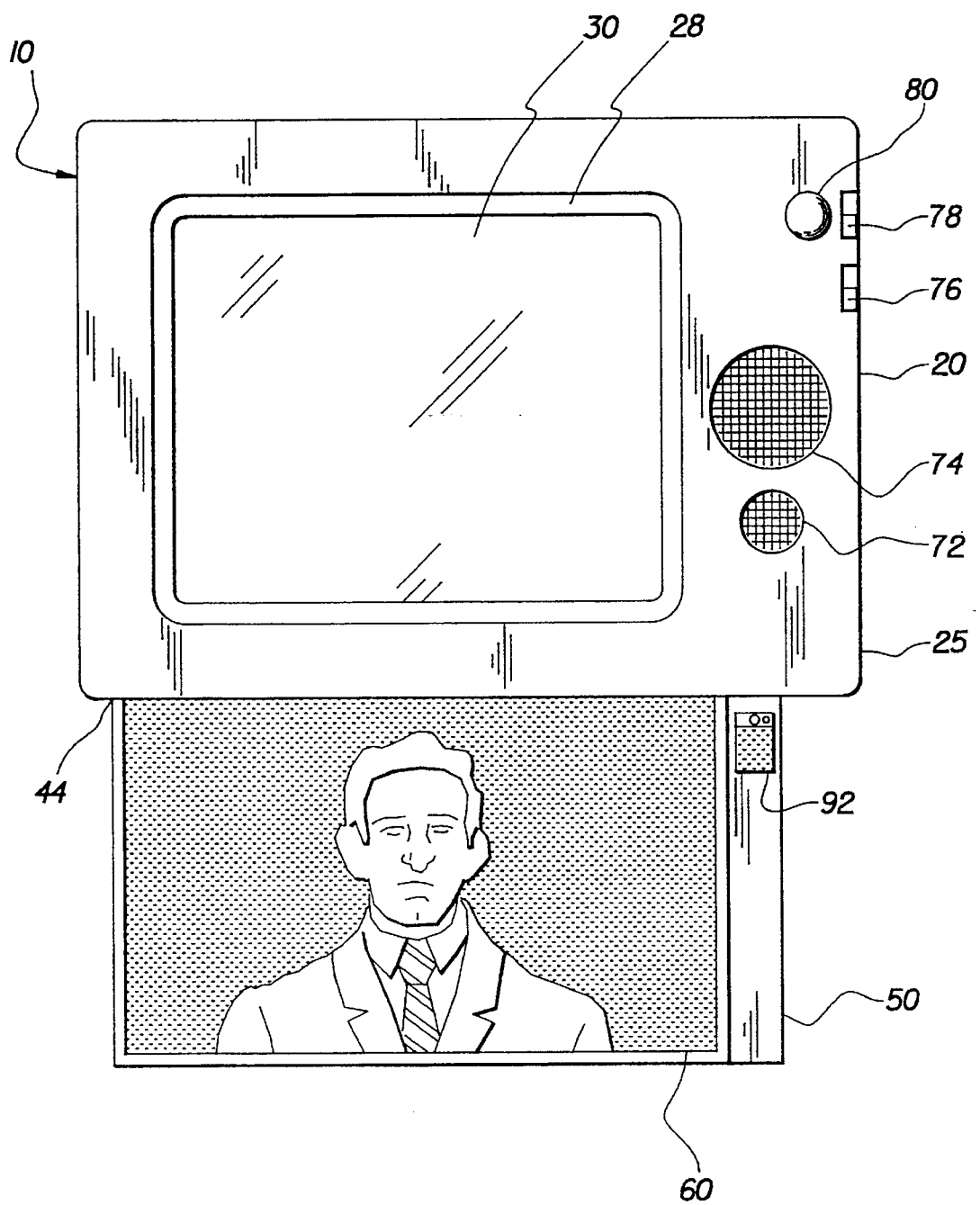
FIG. 7 is a top perspective view of a second embodiment according to the present invention.

Referring specifically then to FIG. 7, a photographic print holder 10 is shown, having a cartridge 50 which can be fully detached from a housing 20 through a slot 44. Housing 20 is constructed as described in the first embodiment to retain the cartridge 50 and to sequentially display prints contained within the body of the cartridge through a viewing aperture 28 having a clear window 30. Window 30 is preferably large enough so that a print can be viewed in its entirety when centered in the viewing aperture 28.

Figure 9:
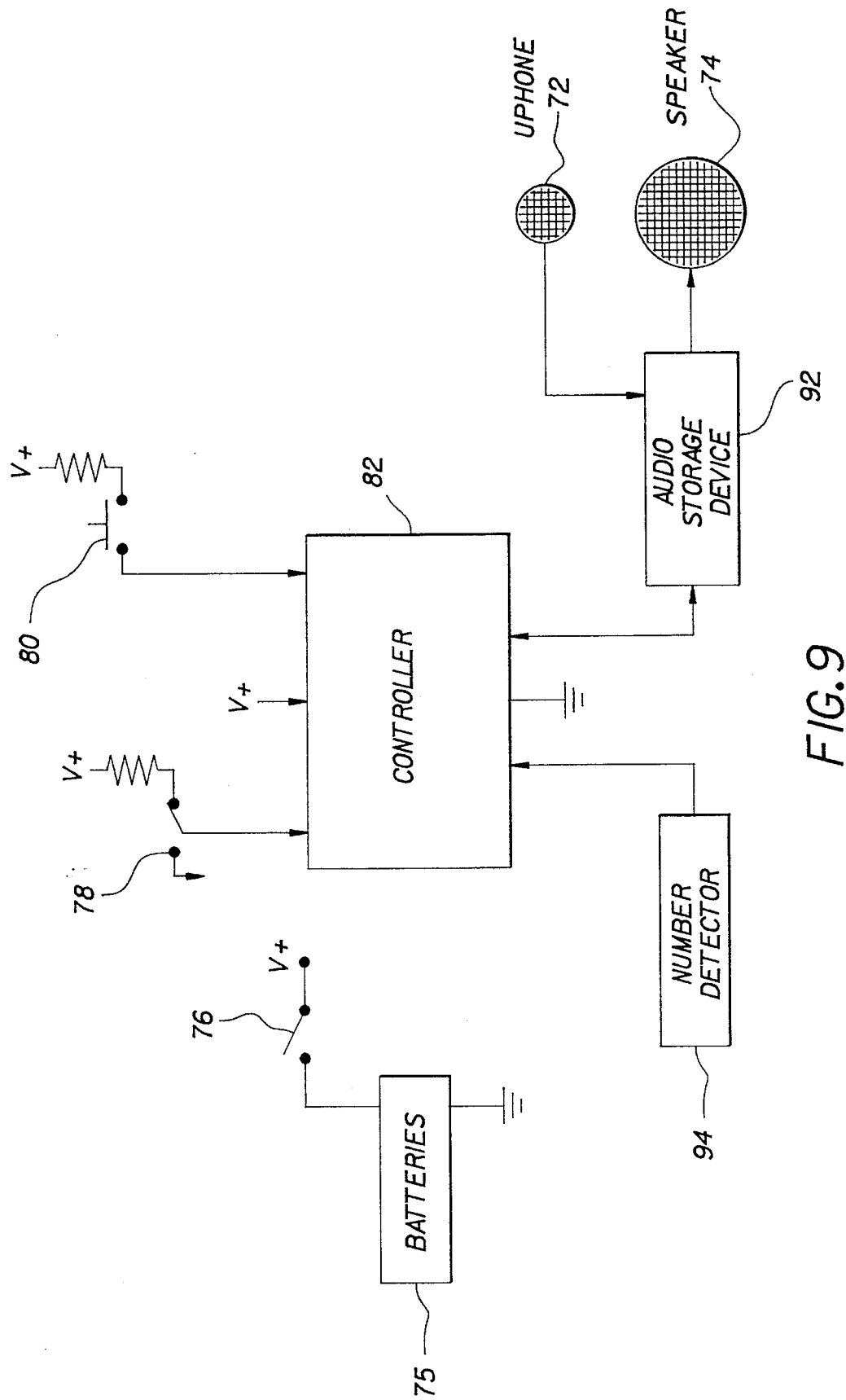
FIG. 9 is a schematic diagram of the electrical subsystem of the apparatus shown in FIGS. 7 and 8.

As in the previous embodiment, and referring to FIGS. 7 and 9, an audio subsystem 70 is provided for the print holder 10 which includes a microphone 72, an audio loudspeaker 74, a START button 80 and switches 76, 78 to enable power to the subsystem and select either an audio RECORD or PLAYBACK mode, respectively. All of the above are attached to an exterior supporting surface 25 of the housing 20.

An audio storage device 92, in this case an audio IC memory chip, such as the ISD 2500 manufactured by Information Storage Systems, Inc., is stored within the housing 20 as described in the preceding embodiment. An array of these devices can be arranged to fit within receptacles (not shown) in the housing portion 20.

In an alternative arrangement, the audio storage device 92 can be mounted directly to the surface of a cartridge 50. This particular configuration allows a stack 60 of photographic prints and corresponding audio information to be separately kept and stored. This provides additional capability for a user of the holder 10 in that a single housing portion 20 can interface with any number of separate cartridges 50. This also provides added user flexibility. In addition, a cover (not shown) can also be optionally provided so that the prints can be retained within the cartridge 50 to provide what essentially becomes an audio photoalbum.

Figure 8A:
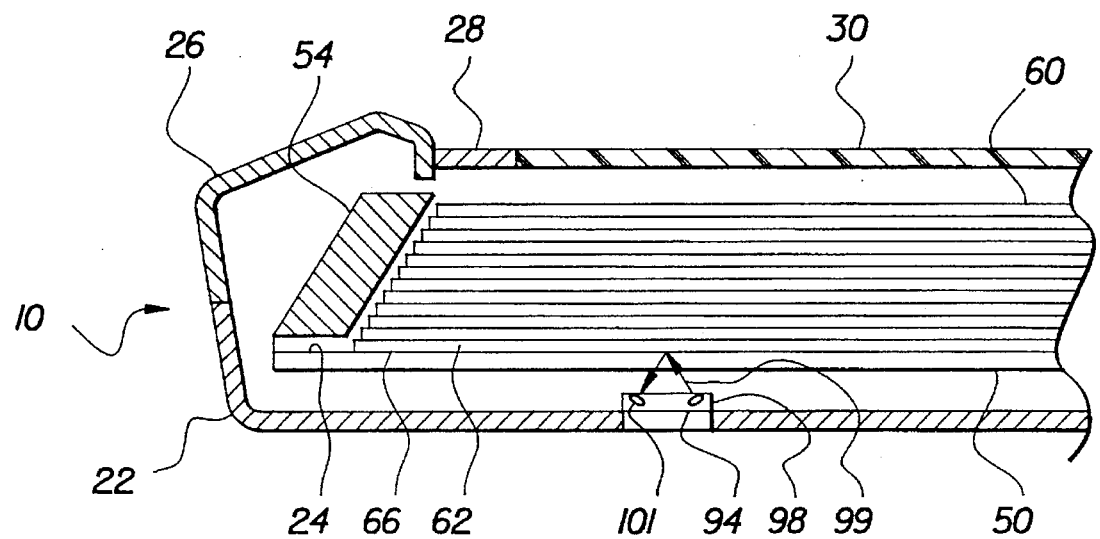
FIGS. 8(a) and 8(b) are a partial side elevational view, partially in section, illustrating means within the device shown in FIG. 7 for identifying a print and a partial bottom view of a loaded print, respectively.
Figure 8B:
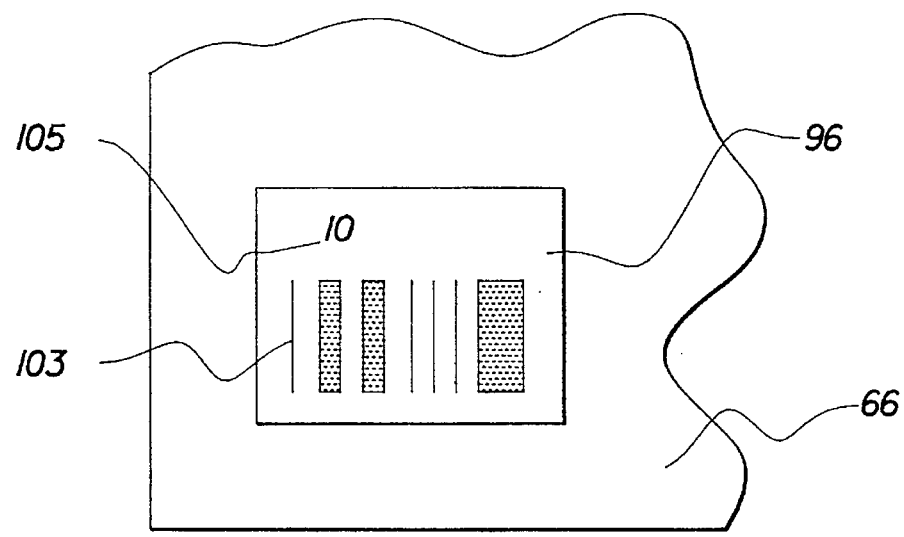

A preferred means for identifying the position of the prints in the cartridge 50 will now be described and referring to FIGS. 8(*a*) and 8(*b*).

An optoelectronic scanning device 94 is positioned along the floor 24 of the housing 20 such as the SPX 1130-3, manufactured by Spectronix, Inc., among others, having an optical beam emitter 98 which emits an optical beam 99 detectable by an adjacent sensor, such as a photosensor 101. The scanning device 94 is electrically interconnected to the controller 82 as shown by the schematic of FIG. 9. An adhesive label 96, having bar-code readable information is affixed to the bottom surface 66 of each photographic print in the stack 60 and is affixed thereto in substantially the same location, see FIG. 8(*b*). Alternately, a unique the information shown on label 96 can be directly backprinted as a step in the photofinishing process of the print. The scanner 94 is positioned within the housing 20 such that the emitted beam 99 will contact a bar-code readable portion 103 of a properly affixed label 96 when the cartridge 50 is fully engaged within the housing. Details pertaining to the operation of bar-code scanning devices are conventionally known to those skilled in the art.

In the embodiment shown, each of the labels 96 have both a bar-code readable portion 103, as well as a corresponding visually readable portion 105, each portion being numbered sequentially, (e.g.; 001, 002, 003, etc) so that the numbers of each label 96 can be read by a user and the bar-code scanner 94.

When a label 96 is sensed by the bar-code scanner 94, a signal corresponding to the number encoded on the bar-code readable portion 103 is scanned and transmitted to the controller 82 which translates or decodes the received signal so as to define a corresponding audio address within the audio storage device 92 and therefore, to the photographic print to which each label is affixed. An advantage realized by these features is that a particular photograph, rather than its position in a stacked sequence, is detected.

Because the controller 82 is not sensitive to the position of a print, a stack 60 of photographic prints using the above means of identification can be removed, shuffled and replaced within the cartridge 50 without interfering with the operation of the device. An additional advantage is realized in that an initialization sequence is not required for a device having this means of encoding photographic prints.

Figure 10:
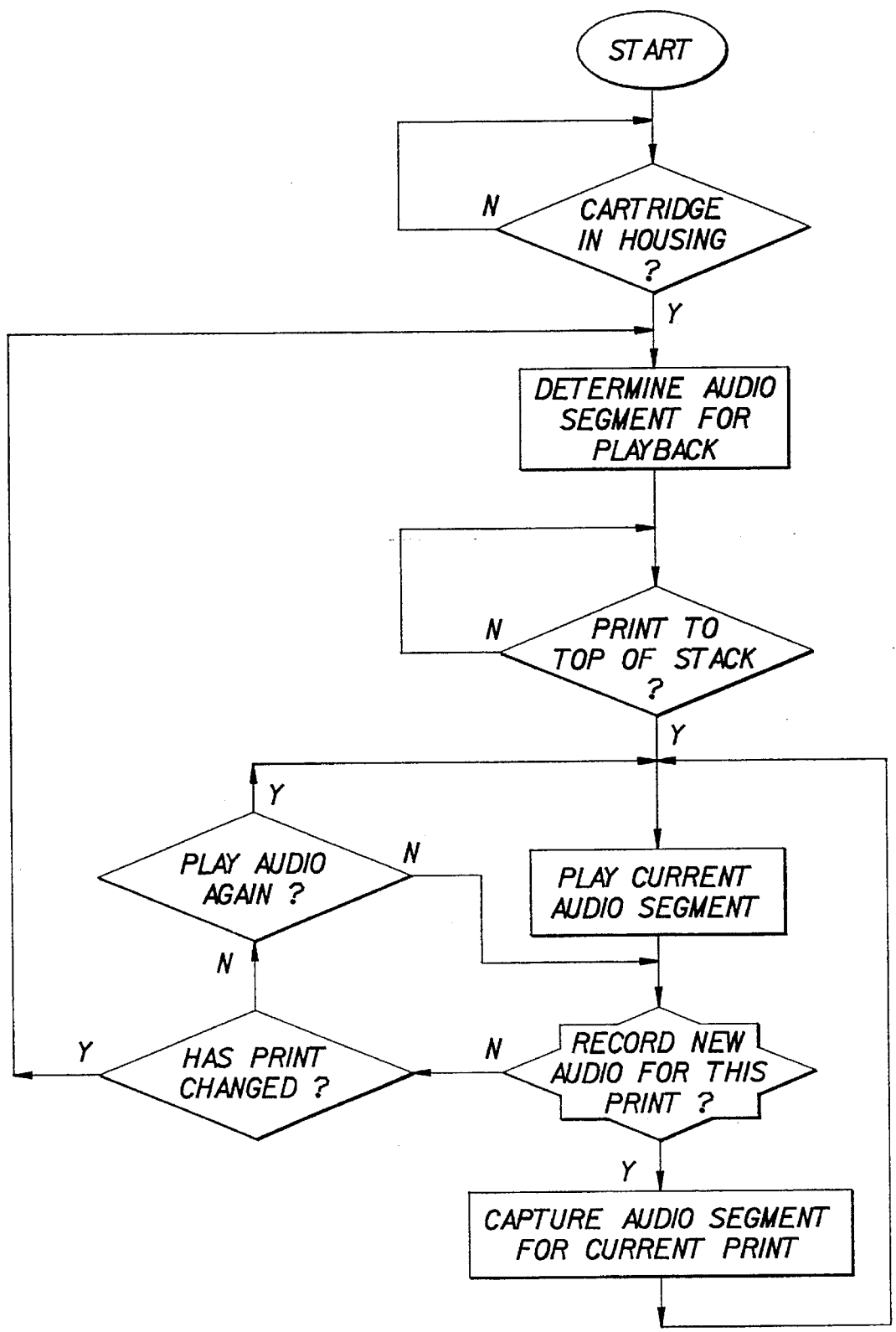
FIG. 10 is a logic diagram of the apparatus shown in FIGS. 7–9.

In operation, and referring specifically to FIGS. 9 and 10, the POWER enable switch 76 is actuated which activates the controller 82 which enables the bar-code scanner 94 to emit the optical beam 99. The bar code scanner 94 detects whether a photographic print is present by detecting a reflected signal from the optical beam 99. This signal is reflected by the back surface of a stored print. If no print is present, then further operation of the audio subsystem 70 is inhibited until the cartridge 50 is engaged with the housing 20.

If a print is present, the controller 82 reads the label 96 as the cartridge 50 is actuated within the device. After the number appearing on the bar code readable portion 103 of the label 96 has been read and decoded, the controller 82 is programmed to wait until the cartridge 50 has again been actuated within the holder 10, bringing the bottom print 62 to the top of the stack 60, and displayed through the window 30. The controller 82 then accesses an address within the audio storage device 92 and the message contained therein (if any) for playback by generating an address directly derived from the encoded picture number. The controller 82 then decodes the corresponding number of the label 96 affixed to the next print 64 at the bottom of the stack 60 that was read during the preceding actuation.

In this manner, the particular order of prints within the stack 60 can be modified at any time, since the controlling electronics are only sensitive to the labels 96 affixed to any one print. In addition, prints can be removed from the stack 60 without interfering with the operation of the device.

The operation of the print holder 10 is similar to that described in the first embodiment. Audio information can be recorded for any or all of the advanced prints. The recorded information can be then accessed for playback through the speaker 74 by setting switch 78 to the PLAYBACK mode and by mechanical advancement of the prints in the holder 10. As each print is advanced, the controller 82 sequentially reads and decodes each label number. The controller 82 accesses the audio address corresponding to the read label number and enables the speaker 74 for playback. The user can also record audio for pictures while they are being viewed in the manner previously described. This recording could be to either edit a previously recorded message or to add audio to a displayed print which previously did not have audio.

Referring to FIGS. 11–14(b), a third embodiment of the present invention is now described wherein photographic prints are not necessarily arranged in vertical type stacks for sequential display.

An album 110 is provided which is book-like, having a cover 112, and a number of individual pages 114 supported by a spine 116. Each page 114 is capable of supporting a plurality of photographic prints for display. Preferably, prints of different sizes or formats can be retained on any single page 114.

Figure 13:
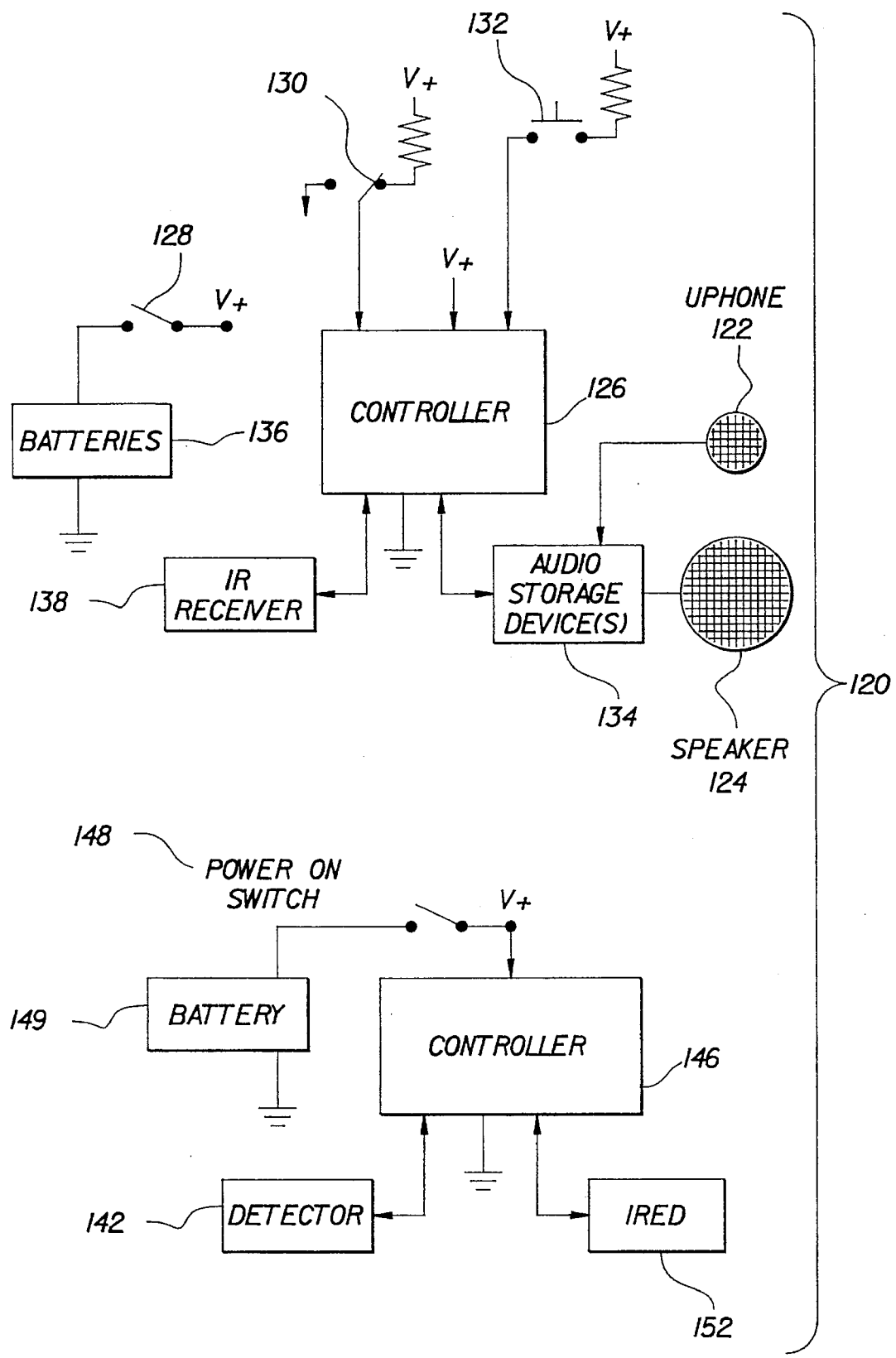
FIG. 13 is a schematic diagram of the electrical subsystem of the apparatus shown in FIGS. 11 and 12.

According to FIG. 13, the album cover 112 has a back portion 118 having a defined interior recess 119 for supporting an audio subsystem 120 used for supplying audio information to a set of displayed prints. A cardboard or other sheet (not shown) is attached to the back portion 118 to cover interior recess 119.

Figure 11:
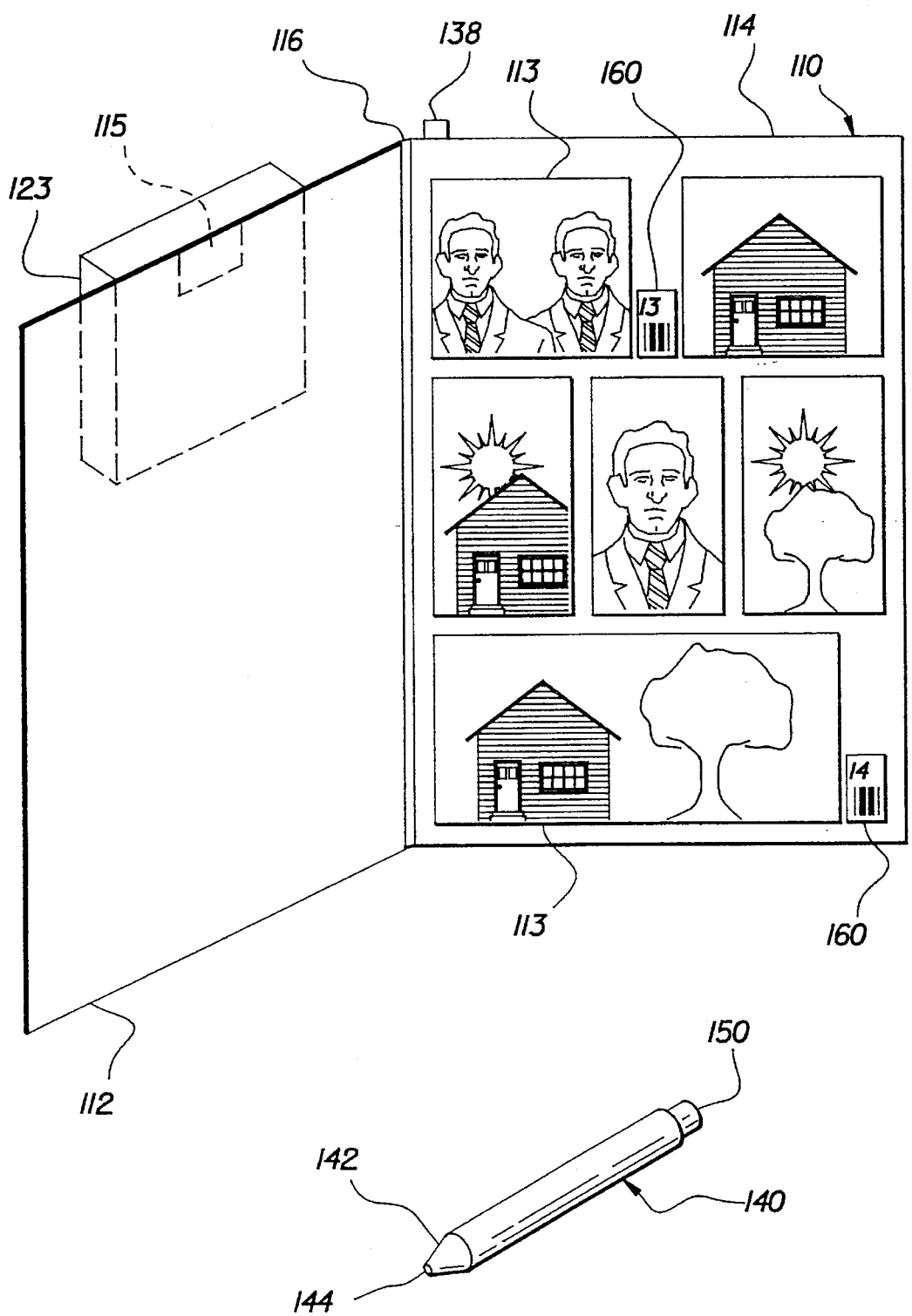
FIG. 11 is a plan view of a third embodiment according to the present invention.
Figure 12:
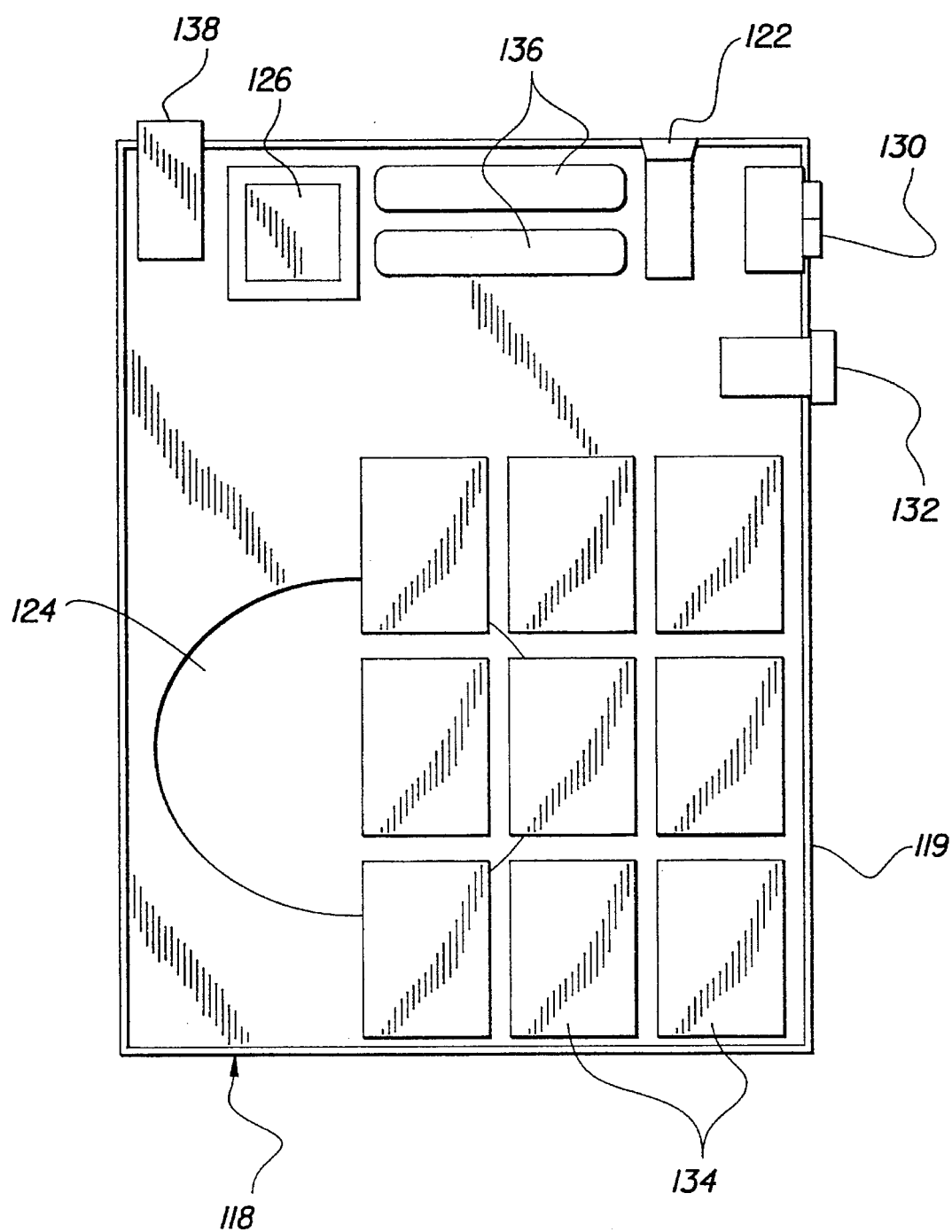
FIG. 12 is a partial top sectional view of the apparatus illustrated in FIG. 11.

In another preferable arrangement and rather than arranging the audio subsystem 120 within a recess of the album cover 112, the components can be arranged within a frame like structure 123 which is attachable to either the inside or the outside of a conventional picture album, such as shown in phantom in FIG. 11. A clip member 115 or other forms of attachment, such as bracketry and the like can be mounted to the inside or outside portion of the album cover 112 to hold the frame structure 123 in place and to allow removal therefrom.

The audio subsystem 120, as shown in FIG. 13, includes a microphone 122, an audio loudspeaker 124, and an interconnected controller 126, such as a M68HC805B6 microprocessor manufactured by Motorola Corporation having nonvolatile memory storage, as described in the preceding embodiments, which is powered by a power supply, in this case batteries 136. Switches are arranged along an exterior edge 117 of the back portion 118 which interface with the controller 126 for setting the audio subsystem 120 in either a RECORD or PLAYBACK mode 130, and to enable power 128. In addition, a start button 132 is provided. The subsystem 120 also includes at least one audio storage device 134, such as from the ISD 2500 family of audio IC memory chips manufactured by Information Storage Systems, Inc, which is capable of storing a plurality of audio messages and driving the interconnected microphone 122 and speaker 124. In this embodiment, a series of IC chips can be arranged within the interior recess 119 as shown or within the frame structure 123, FIG. 11. Finally, an infrared receiver 138 is also positioned within the back portion 118 of the album 110 which is electrically interconnected to the controller 126 per the schematic of FIG. 13. The details of each of the above components defining the audio subsystem 120 are described in greater detail below.

The album 110 is additionally provided with a portable IR scanner/transmitter or wand 140 comprising a first end 144, having an attached optoelectronic bar-code scanning device 142. The scanning device 142, such as the Spectronics SPX-1160-3, manufactured by the Spectronics, Corp, includes an optical beam emitter/detector pair which is capable of scanning bar-coded information as is conventionally known and described previously. A control unit 146, contained within the body of the wand 140, is provided to decode the signal as read by the scanning device 142, and is electrically interconnected, see FIG. 13, to the scanning device 142, as well as to an infrared transmitter 150 positioned at the other end of the wand 140. The wand control unit 146 and related components are powered by a power supply, such as a contained battery 149, which is enabled by means of a switch 148. The album IR receiver 138 and the wand IR transmitter 150 define an IR emitter and IR detector pair 152 which provides a means of communication thereby linking the wand 140 to the remainder of the audio subsystem 120 in a manner common to that used between remote control units and electronic equipment such as telvisions, stereos, VCRs and the like.

A set of adhesive labels 160 having a bar-code readable portion 162, as well as a visually readable portion 164 are selectively placed adjacent either a single photograph or group of photographs on a page 114 in the album 110.

Figure 14A:
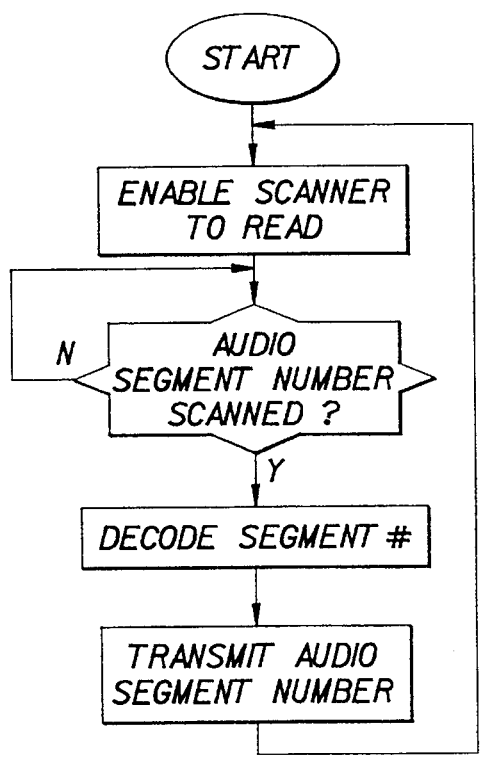
FIGS. 14(a) and 14(b) are logic diagrams of the apparatus illustrated in FIGS. 11 and 12.
Figure 14B:
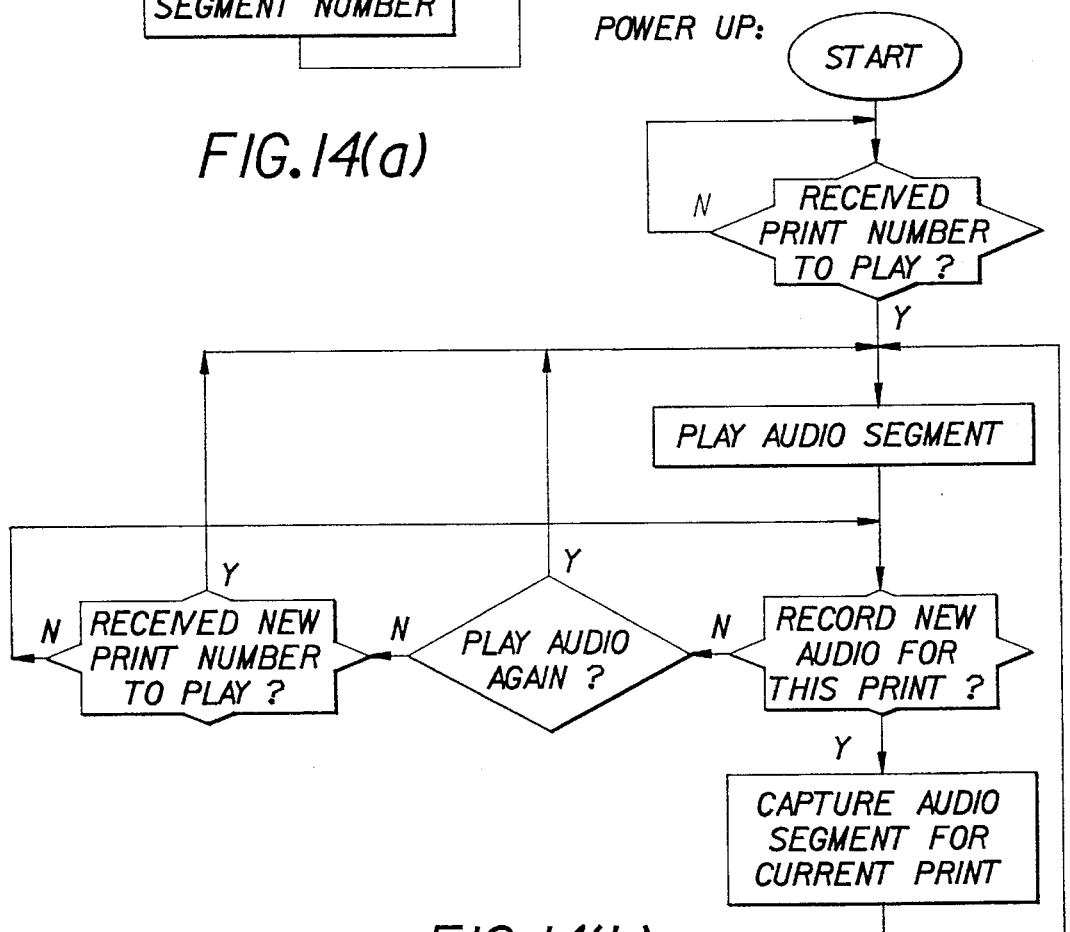

In operation, according to a preferred protocol and referring specifically to the diagrams depicted in FIGS. 13, 14(a) and 14(b), a user first selects those photographic prints displayed within the album 110 to which he or she wishes to record an audio message or segment. Adhesive labels 160 are then affixed adjacent the print or prints on a page 114 of the album 110.

If audio information is to be recorded, the audio subsystem 120 is enabled by setting the switch 128 to the ON position and by setting the corresponding POWER switch 148 on the wand 140. Using the wand 140, the user scans by pointing the scanning end 142 at any of the affixed labels 160 so that the direction of motion is substantially orthogonal to the individual bars defining the label, see FIG. 11. The number on the label 160 which is scanned by the device 144 corresponds to a corresponding audio address within one of the audio storage devices 134 contained within the back portion 118 of the album 110, or attached as frame structure 123, FIG. 11.

The signal scanned by the scanning device 144 is decoded by the wand control unit 146 and is relayed to the IR receiver 138 located on the album 110 via the wand IR transmitter 150.

The received IR signal is then decoded by the controller 126 found in the album 110 which uses the decoded signal to access an appropriate audio storage device 134 and corresponding address location depending on the information which has been scanned on the label 160. Audio can then be recorded into the audio storage device 134 via microphone 122.

If audio information is to be played, setting the power switch 128 to ON initializes the controller 126 to determine whether or not a signal has been received from the IR transmitter 150 corresponding to a particular print number (and corresponding audio address within an appropriate audio storage device 134). This initialization occurs whether the device is in RECORD or PLAYBACK mode.

If the picture number information from a label 160 has been received by the album controller 126 in the PLAYBACK mode, then the audio storage device 134 and corresponding audio address is accessed and speaker 124 is enabled to allow playback of a message which is stored at the accessed address.

If PLAYBACK mode is selected, the audio message previously recorded can be heard through speaker 124, once the picture number has been transmitted and the audio address information has been received by the album controller 126. Actuating the START button 132 in PLAYBACK mode reaccesses the current audio address for replay of the message. The described method of identifying the sound segments with prints is particularly advantageous in that prints can conveniently be relocated within the album or removed therefrom altogether. Additionally, sound segments can be associated freely with prints or groups of prints.

Figure 15A:
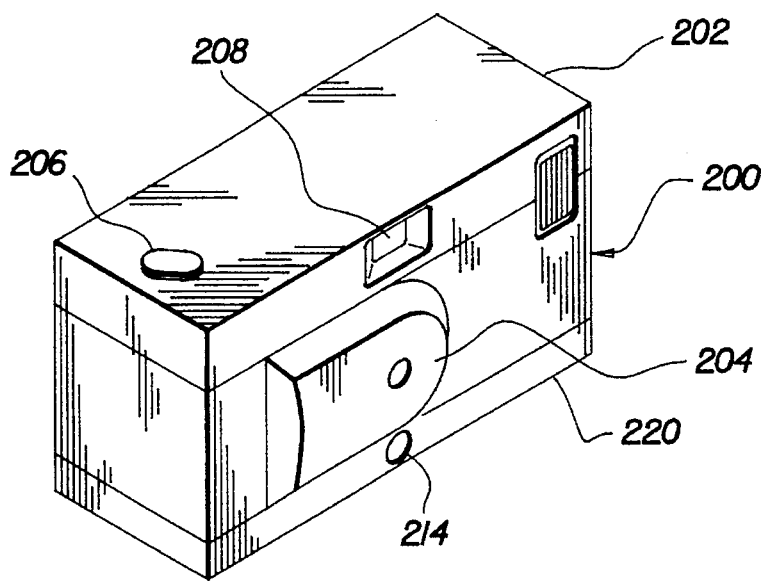
FIG. 15 is a front perspective view of a fourth embodiment according to the present invention.
Figure 15B:
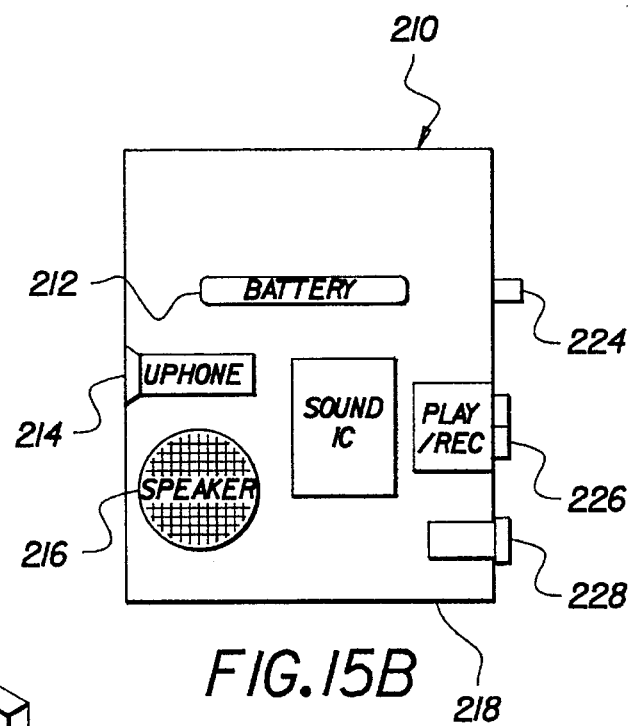
Figure 15C:
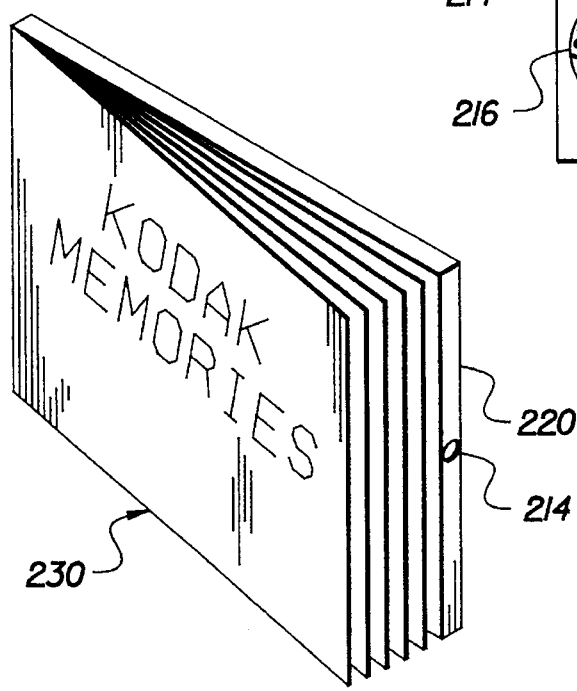
Figure 16:
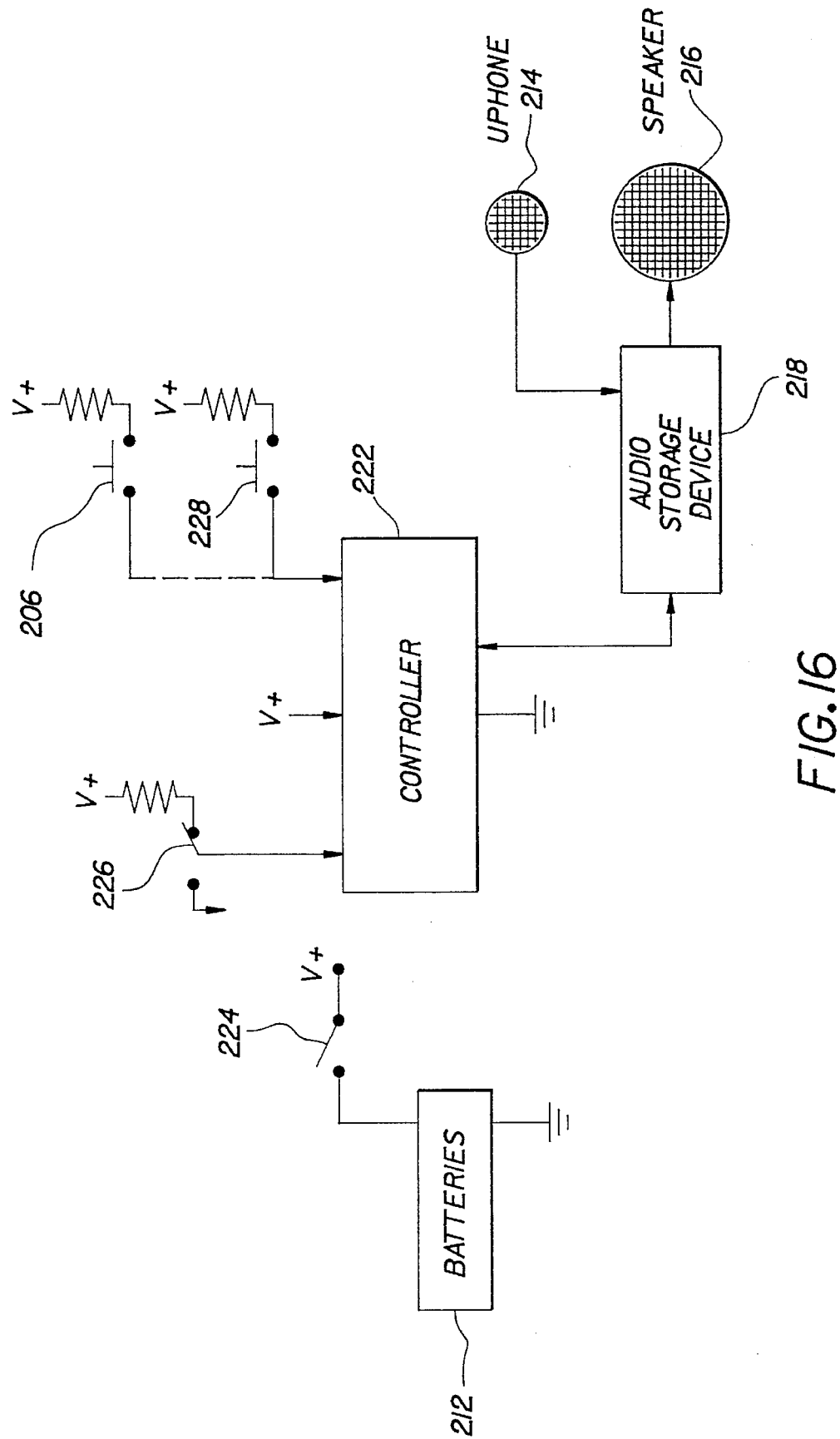
FIG. 16 is an electrical schematic diagram of the apparatus illustrated in FIG. 15.
Figure 17:
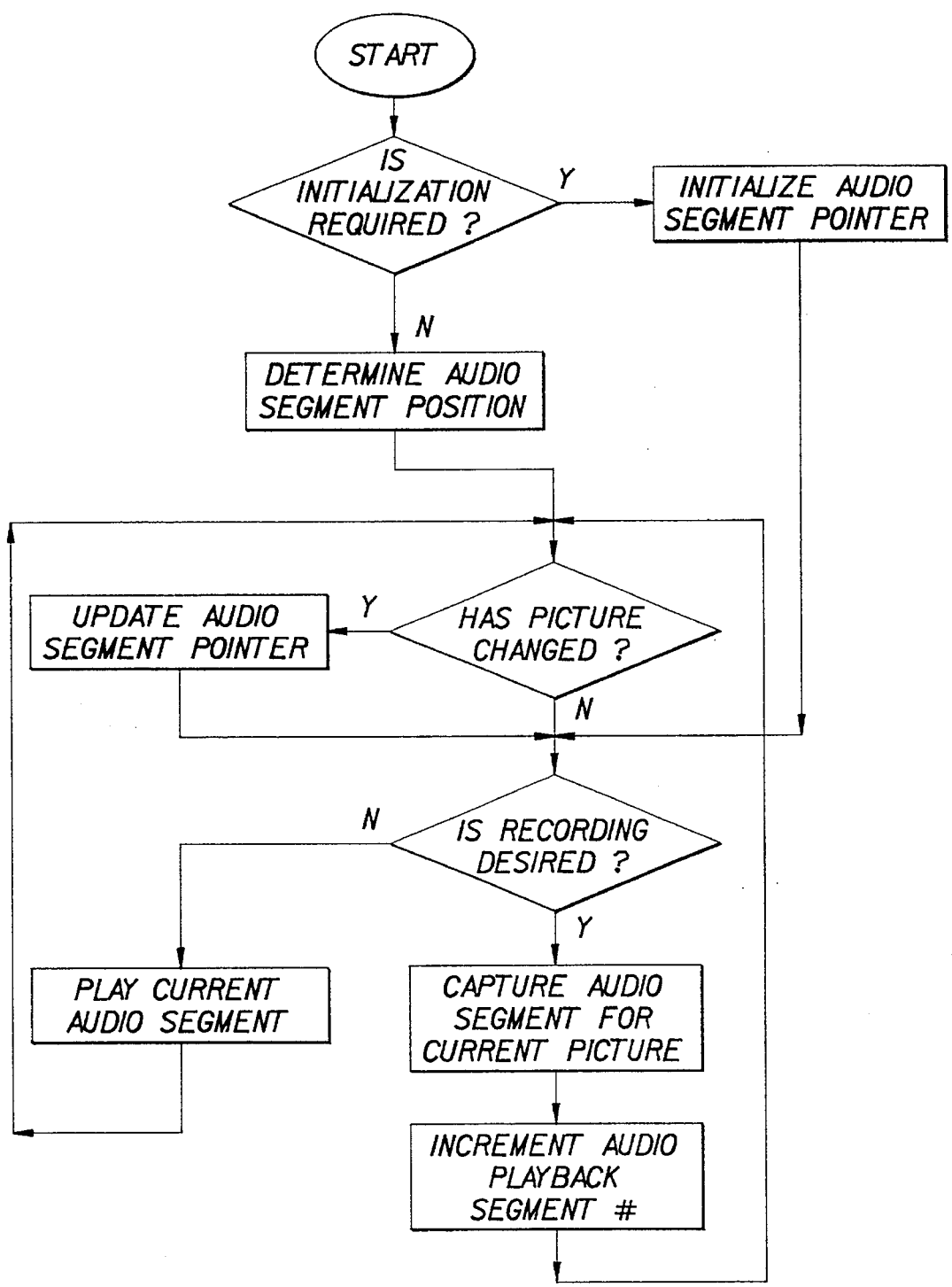
FIG. 17 is a logic diagram of a method of operating the apparatus illustrated in FIGS. 15 and 16.

Referring now to FIGS. 15–17, a fourth embodiment of the present invention is herein described. A camera 200, such as the FUNSAVER single-use camera manufactured by the Eastman Kodak Company, is provided having a plastic injection-molded body 202, a picture taking lens 204 fitted to the body 202, a shutter release button 206 for opening a shutter mechanism (not shown) to allow light to enter the camera body, and a viewfinder 208 for defining a field of view of the taking lens. Each of these elements are common to known still photographic cameras, those details not relating directly to the present invention have been deleted for clarity.

The camera 200 is also equipped with a detachable audio subsystem 210 comprising a battery 212, a miniature microphone 214, a corresponding miniature audio speaker 216, and at least one audio storage device 218, capable of recording and playing back at least one audio message and having drivers for the microphone and speaker. The above components are nested within the interior of a housing 220 made from plastic or other lightweight material, such as stiff cardboard. In this embodiment, the audio storage device 218 is a single IC memory chip from the ISD 2500 family and manufactured by Information Storage Devices, Inc as described above in the previous embodiments.

Also within the housing 220 is a control unit 222, FIG. 16, such as a microprocessor having a nonvolatile storage area. In the embodiment described, the control unit 222 is a M68HC805B6 microprocessor manufactured by Motorola Corporation, previously referred to above, which is electrically interconnected to the components of the audio subsystem 210 in the manner shown in FIG. 16. Alternatively, the camera controller (not shown) can be used in lieu of the control unit 222 to electrically interconnect the above components as well as the functioning components of the camera 200, including the camera shutter release button 206 as described in greater detail below.

A set of switches 224, 226 which are externally accessible from the detachable housing 220 are also provided and electrically connected to the control unit 222 for enabling the audio subsystem 210 to be powered by the battery 212 and for setting the subsystem in either a RECORD or a PLAYBACK mode. See FIG. 16.

As noted above the housing 220 retaining the audio subsystem 210 is preferably made to be detachable from the camera body 202, such as by including a set of VELCRO strips (not shown) on the upper surface of the housing to allow easy attachment and detachment from the bottom portion of the camera body. It should be apparent, however, that other conventional attaching means, such as clips (not shown), or tabs having corresponding engagement portions (not shown) on the camera body 202 can alternatively be provided.

Referring to FIG. 15, the housing 220 and audio subsystem 210 can be removed from the camera body 202 after photographs have been taken by the camera 200. Using either the camera controller, if available, or the control unit 222, a user can record audio data corresponding to a picture(s) as it is being taken by the camera 200 and can subsequently remove the housing 220 for attachment to an album booklet 230. The audio subsystem 210 can then be enabled to playback audio segments corresponding to prints displayed in the booklet 230.

Referring specifically to the logic diagram of FIG. 17, the operation of the camera 200 in conjunction with the audio subsystem 210 will now be described. The camera 200 is originally either provided with a preattached housing 220 or one is attached using the VELCRO strips to the bottom of the camera body 202. When the camera 200 is to be used, power enable switch 224 is enabled to power up the subsystem 210 in order to derive index numbers to create a correspondence between a set of exposures and any audio segments to be recorded for subsequent playback.

As an exposure (picture) is being taken the user can elect to record an audio message by setting switch 226 to RECORD mode and by depressing a provided START button 228 which is positioned along the exterior of the housing 220. The control unit 222 then assigns a picture print number by incrementing the index register. Initially, the register is incremented from "0" to "1".

Upon depressing the START button 228 (or alternatively the shutter release button 206 if the camera controller (not shown)is used), the control unit 222 enables the microphone 214 and accesses the audio storage device 218 for audio recording and playback. An audio message is then recorded by the microphone 214 at a discrete audio address within the audio storage device 218 as previously described with the control unit 222 storing the location of the audio address and the corresponding picture print number in its nonvolatile memory storage area.

Succeeding exposures can then be taken by the camera 200 using the attached housing 220 to selectively record audio segments. As each print is advanced, the index register is also advanced by one position, in a preferable mannner by the use of the shutter release button 206, so that an index number can be assigned to each advanced exposure independently of whether or not an audio message has been recorded, to form a playback list similar to that shown in FIG. 6.

As is apparent from the preceding discussion, the audio subsystem 210 need not be enabled for picture taking; that is, audio segments can be added to the pictures at a later time, such as after the prints have been placed in the album booklet 230 for display. This adds a high degree of flexibility as to how the present invention can be utilized in that audio messages corresponding to a set of displayed prints can be recorded at the time of the actual picture taking event, such as by participants of the event or provided at a later time. In addition, the audio messages can be later changed or otherwise edited.

As is evident from the foregoing description, certain aspects of the invention are not limited to the particular details of the examples illustrated, and it is therefore contemplated that other modifications and applications will occur to those skilled in the art.

It is accordingly intended that the claims shall cover all such modifications and applications as do not depart from the true spirit and scope of the invention.

PARTS LIST FOR FIGS. 1–17

10 photographic print holder
20 housing
22 bottom shell section
24 floor
25 supporting surface
26 top shell section
27 exterior edge
28 viewing aperture
30 window
44 slot
50 cartridge
52 side pieces
54 separator bar
56 arrow
58 front wall
60 stack of prints
62 bottommost print
64 succeeding print
66 back surface of print
70 audio subsystem
72 microphone
74 audio loudspeaker
75 power supply
76 POWER enable switch
78 RECORD/PLAYBACK mode switch
80 START button
82 controller
84 cartridge detector
86 LED
88 photosensor
89 optical beam
91 reflected beam
94 bar code scanner
96 label
98 optical beam emitter
99 optical beam
101 photosensor
103 bar-code readable portion
105 visually readable portion
110 album
112 cover
114 pages
113 prints
115 clips
116 spine
117 exterior edge
118 back portion
119 interior recess
120 audio subsystem
122 microphone
123 attachable frame structure
124 audio loudspeaker
126 controller
128 POWER enable switch
130 RECORD/PLAYBACK switch
132 START button
134 audio storage devices
136 batteries
138 IR receiver
140 wand
142 bar code scanner
144 end
146 control unit—wand
148 POWER enable switch
149 battery
150 IR transmitter
152 IRED
160 labels
162 bar-code readable portion
164 visually perceptible portion
200 camera
202 body
204 taking lens
206 shutter release button
208 viewfinder
210 audio subsystem
212 battery
214 microphone
216 speaker
218 audio storage device
220 housing
222 control unit
224 switch
226 switch
228 START button
230 album

What is claimed is:

1. A display apparatus comprising display means for holding a plurality of still images and for displaying the images successively in a viewing aperture, and advance means for sequentially advancing the images one at a time to said viewing aperture, is characterized by:

storage means for storing audio information corresponding to at least one of a plurality of still images to be displayed in said viewing aperture;

playback means for playing back audio information stored by said storage means when at least one still image is advanced to said viewing aperture for display, wherein said display means includes a housing and a releasably attachable cartridge engageable with said housing in which said cartridge includes supporting means for retaining a plurality of still images; and attachment means for attaching said audio storage device to said cartridge for retaining audio messages corresponding to a plurality of retained still images.

2. A display apparatus for displaying a plurality of still images comprising an album-like structure, including a cover and a plurality of pages, each said page having means for displaying at least one still image, is characterized by:

audio storage means for storing audio information corresponding to at least one displayed still image;

playback means for selectively playing back audio information stored by said audio storage means, wherein said means for displaying includes means for identifying an address within said audio storage means where said audio information is stored, and in which said audio storage means and said playback means are attached to said album-like structure; and control means interconnecting said audio storage means, said playback means and said displaying means for storing and accessing audio information corresponding to said at least one displayed still image, wherein said displaying means includes a plurality of scannable labels, each said label being affixable in the vicinity of at least one displayed still image and containing address information for said audio storage means, said apparatus including scanning means for scanning address information from said labels, wherein said control means includes means for selectively receiving scanned information from said scanning means and for accessing said audio storage means for playback of audio information corresponding to at least one displayed still image.

3. A display apparatus as recited in claim 2, including attachment means for releasably attaching said audio storage means and said playback means to said album-like structure.

4. An apparatus as claimed in claim 2, wherein said scanning means includes a scanning device capable of reading said scannable labels.

5. An apparatus as claimed in claim 4, wherein said scannable device includes means for attaching to said album-like structure, said device having an optoelectronic sensor for reading information on a scannable label affixed to a page within said album-like structure.

6. A system for combining audio information with still image media comprising a camera having a body and means within the body for the taking of exposures, and a display apparatus having means for displaying at least one photographic print of exposures taken by said camera, is characterized by:

a movable device having releasable attachment means for attaching to the exterior of said camera body and said display apparatus, said movable device including means for selectively recording and playing back audio information corresponding to at least one exposure taken by said camera and at least one photographic print displayed by said display apparatus.

7. A system as claimed in claim 6, wherein said camera body includes a Velcro strip attached to at least one side for attachment by said device having a corresponding Velcro strip.

8. A system as claimed in claim 6, wherein said movable device includes a microphone for allowing audio information to be recorded, at least one audio storage device onto which said recorded audio information is recorded, a speaker to allow said recorded audio information to be played back from said at least one audio storage element, and control means interconnecting said at least one audio storage element, said microphone and said speaker.

9. A display apparatus comprising means for retaining a stack of still images and means for sequentially advancing said stacked images one at a time to a viewing aperture;

first storage means for storing audio information corresponding to at least one still image to be displayed in said viewing aperture;

playback means for playing back audio information stored by said first storage means when at least one still image is displayed in said viewing aperture; and scanning means for scanning information individually affixed to each of said still images, said information indicating a corresponding storage location of said audio information stored in said first storage means, is characterized by:

second storage means for storing the storage information scanned by said scanning means; and control means for accessing audio information stored in said first storage means corresponding to a first still image displayed in the display aperture for playback by said playback means, and for simultaneously causing said scanning means to scan storage information affixed to a succeeding still image to be advanced into the viewing aperture for storage by said second storage means.

10. An apparatus according to claim 9, including means for recording audio information corresponding to a still image displayed in said viewing aperture into said first audio storage means, said means including a microphone.

11. An apparatus according to claim 9, wherein said still image is a photographic print having an image area, wherein said affixed information is encoded onto said print in a location which is not within the image area.

12. An apparatus according to claim 9, wherein said control means is a microprocessor.

13. An apparatus according to claim 11, wherein said scannable information is a bar code label affixed to the back side of the print.

14. An apparatus according to claim 13, wherein said scanning means is configured to scan the back surface of the bottommost stacked still image.

15. An apparatus according to claim 13, wherein said advancing means sequentially advances the bottommost stacked still image into the viewing aperture for viewing.

16. An apparatus according to claim 15, including a body portion having the viewing aperture, and a releasably attachable tray member for retaining said stacked still images, wherein said first audio storage means is attached to said tray member.

17. A method of sequentially displaying a stack of still images in a display apparatus, said apparatus having first audio storage means for storing audio information corresponding to at least one stacked still image, each of said stacked still images having scannable information pertaining to an audio address in said audio storage means affixed thereto, comprising the steps of:

i) placing said stacked still images in said display apparatus;

ii) advancing the bottommost stacked still image to the top of the stack and into a viewing aperture;

iii) scanning the scannable information from the succeeding bottommost image of the stack of still images;

iv) storing the information scanned from the bottommost print in a second storage means;

v) advancing the succeeding bottommost print to the top of the stack and into the viewing aperture;

vi) accessing the audio information from the first storage means using the information stored in the second storage means; and vii) playing back the audio information stored in said first audio storage means corresponding to the displayed print, while simultaneously:

a) scanning the scannable information from the next succeeding bottommost print of the stack of still images; and b) storing the information scanned from the bottommost print in the second storage means.

18. A method as claimed in claim 17, wherein said apparatus includes a body portion which retains the bottommost stacked still image and a slidable tray member for retaining the remainder of the stacked still images, and including the steps of:

pulling the tray member out of the body portion in order to advance the bottommost still image into the viewing aperture; and pushing the body portion back into the body portion to position the remainder of the stacked still images below the bottommost still image, said pushing step causing control means to access the storage information in said second storage means to access the audio information in said first storage means pertaining to the displayed still image for audio playback, and simultaneously causing said scanning means to scan the scannable information on the succeeding bottommost still image for storage in the second storage means.

19. A method of combining photographic media with corresponding audio segments for display and playback, comprising the steps of:

i) taking at least one photographic exposure with a camera, said camera having a body;

ii) capturing at least one audio segment corresponding to an exposure using an audio module releasably attached to the exterior of said camera body, said audio module having recording and playback means;

iii) detaching said audio module from the exterior of said camera body;

iv) attaching said audio module to a display apparatus having means for displaying at least one photographic image; and v) playing back the audio segment captured by said audio module.

20. A method as claimed in claim 19, wherein said audio module contains at least one Velcro strip to allow said module to be releasably attachable to said camera body and said display apparatus, further including the step of attaching said audio module to said camera body prior to said taking step.

21. A method as claimed in claim 19, wherein said audio module contains a microphone to allow audio information to be captured, at least one audio storage element onto which said audio information is stored, a speaker to allow the captured information to be played back, and switching means to allow audio information to be recorded and played back through said microphone and said speaker, further including the steps of:

engaging said switching means to selectively allow audio information to be gathered onto said audio storage element through said microphone, and to allow captured audio information to be played back, wherein said switching means can selectively be engaged to allow playback and record when said audio module is attached to said camera body and said display apparatus.

22. A system as claimed in claim 21, wherein said camera is a single-use camera.

* * * * *